H. G. STEELE.
AUXILIARY TRACTION WHEEL FOR MOTOR VEHICLES.
APPLICATION FILED JAN. 18, 1919.
1,337,672.
Patented Apr. 20, 1920.
3 SHEETS—SHEET 1.
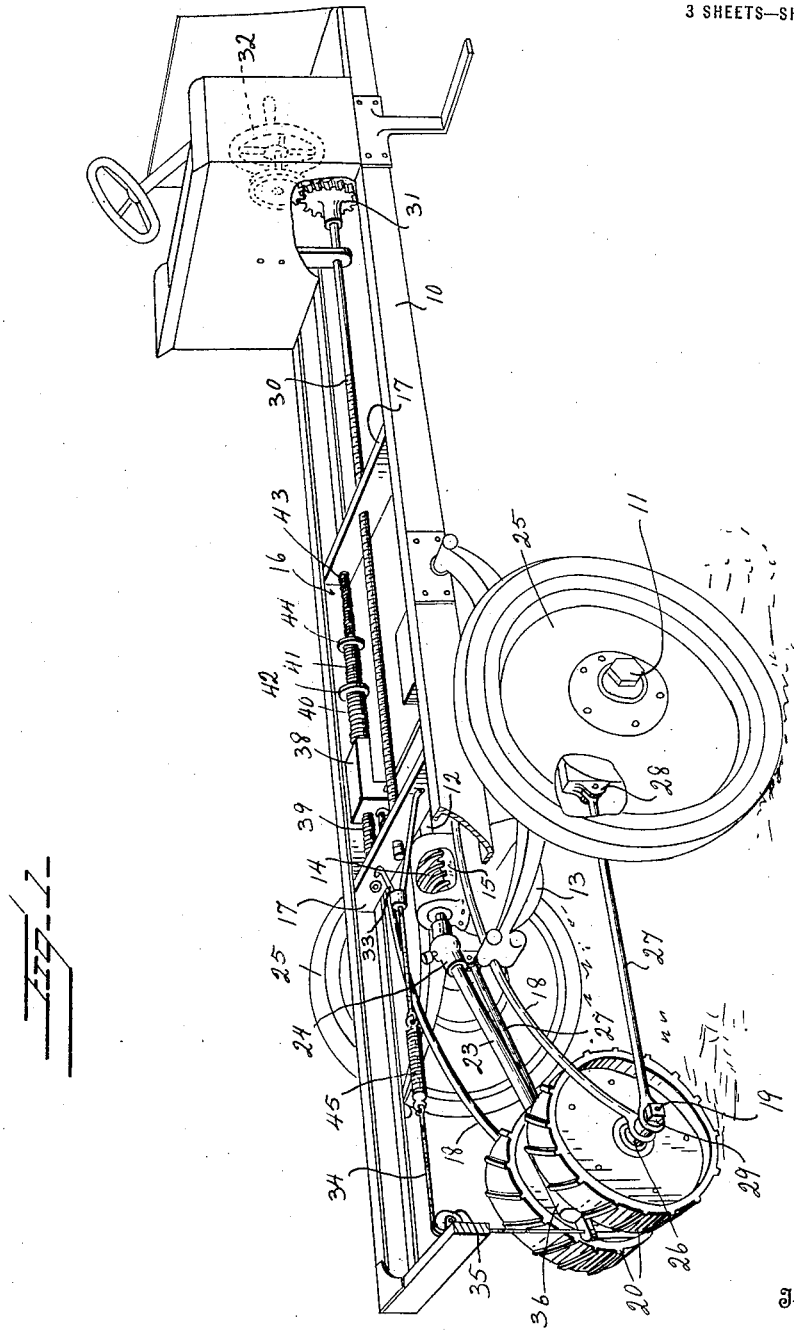
Inventor
H.G. Steele
By Watson E. Coleman
Attorney

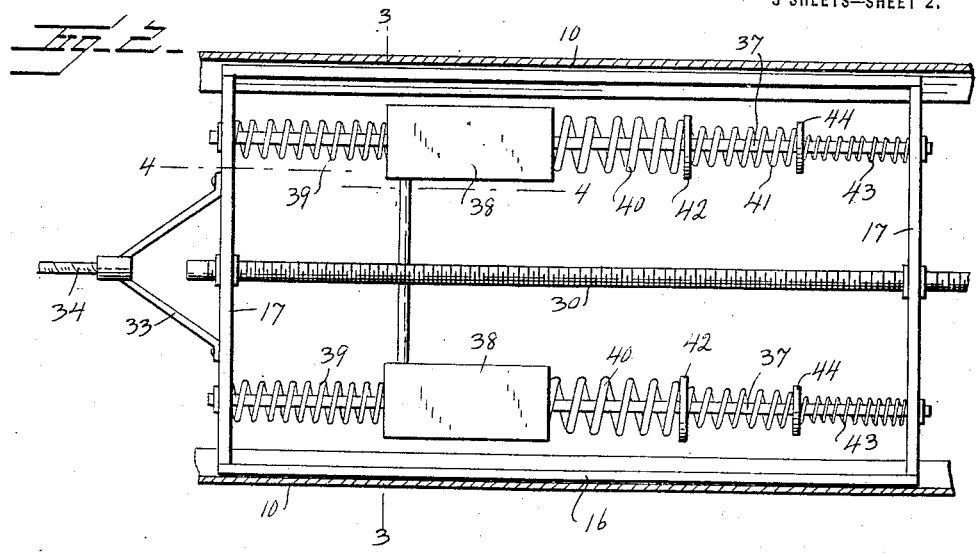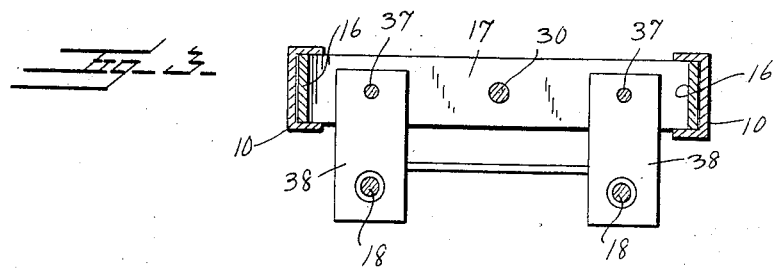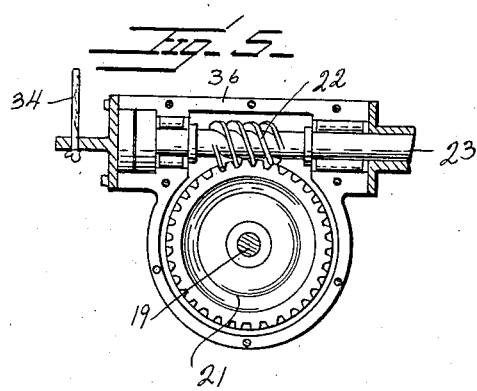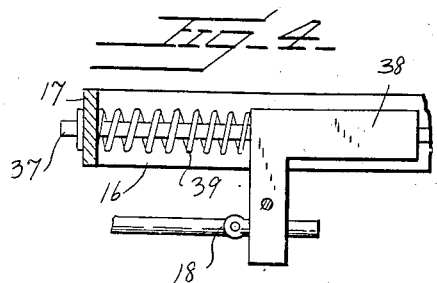

H. G. STEELE.
AUXILIARY TRACTION WHEEL FOR MOTOR VEHICLES.
APPLICATION FILED JAN. 18, 1919.
1,337,672. Patented Apr. 20, 1920.
3 SHEETS—SHEET 3.
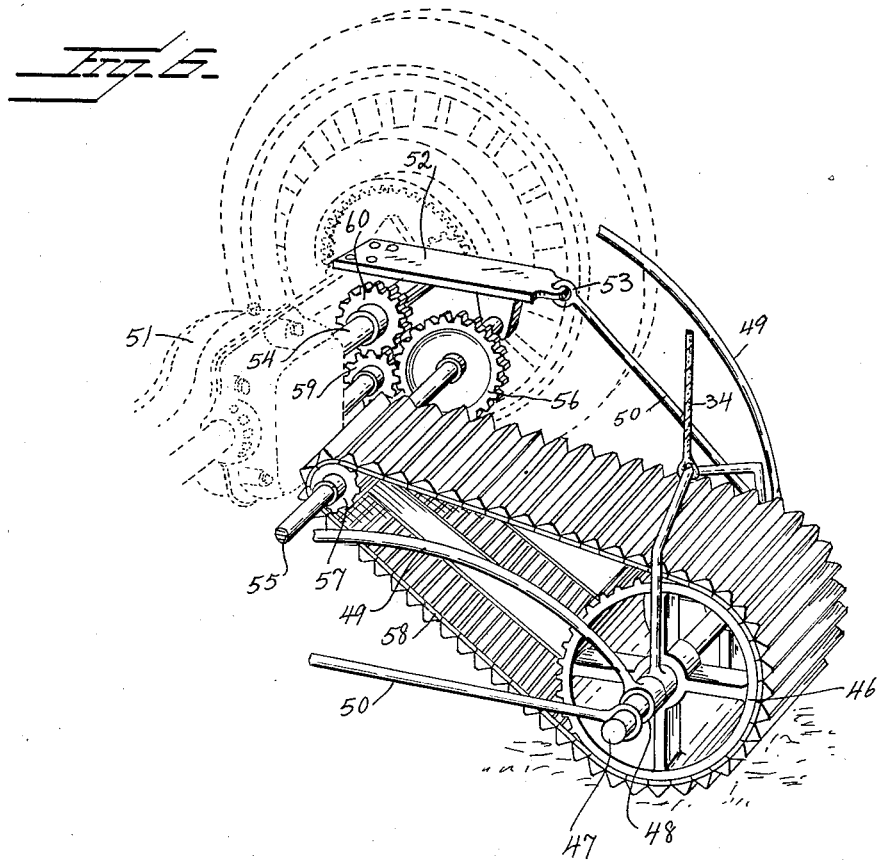
Inventor
H.G. Steele
By Watson E. Coleman
Attorney

UNITED STATES PATENT OFFICE.

HARNEY G. STEELE, OF JOHNSTOWN, PENNSYLVANIA.

AUXILIARY TRACTION-WHEEL FOR MOTOR-VEHICLES.

1,337,672. Specification of Letters Patent. Patented Apr. 20, 1920.

Application filed January 18, 1919. Serial No. 271,804.

*To all whom it may concern:*

Be it known that I, HARNEY G. STEELE, a citizen of the United States, residing at Johnstown, in the county of Cambria and State of Pennsylvania, have invented certain new and useful Improvements in Auxiliary Traction-Wheels for Motor-Vehicles, of which the following is a specification, reference being had to the accompanying drawings.

This invention relates to motor vehicles and particularly to traction means therefor.

The general object of the invention is to provide an auxiliary traction wheel which is normally supported out of operative engagement with the ground or other surface but which may be placed in operative relation with the ground by the operator of the vehicle.

A further object is to provide a construction of this character including an auxiliary traction wheel operatively connected to the driving shaft or driving mechanism of the vehicle and which is raised or lowered by means of a controlling wheel mounted adjacent to the driver's seat, thus permitting the driver without leaving his seat to lower the auxiliary traction wheel in order to gain more power where the machine is operating on heavy roads, through mud, sand or snow.

A further object is to provide a construction of this character in which the auxiliary traction wheel is yieldingly held into engagement with the ground and in which the shocks and jars communicated to the traction wheel will be cushioned by suitable cushioning springs.

A further object is to provide a construction of this character which is very simple and readily applied to trucks and other vehicles and which is thoroughly effective as a means for providing additional tractive power whenever the necessities of the case require.

Other objects will appear in the course of the following description.

My invention is illustrated in the accompanying drawings, wherein:—

Figure 1 is a perspective view of a portion of a motor truck with my auxiliary drive attached thereto;

Fig. 2 is a fragmentary top plan view of the truck, the channel irons 10 being in section;

Fig. 3 is a section on the line 3—3 of Fig. 2;

Fig. 4 is a section on the line 4—4 of Fig. 2;

Fig. 5 is a vertical sectional view through the housing 36; and

Fig. 6 is a fragmentary perspective view of another form of drive, the adjacent portion of the truck being shown in section.

In Figs. 1 to 5, I show one form of my mechanism applied to a motor truck, the motor for the truck and the connections of the motor to the driving shaft, the transmission gears and like parts being omitted. Referring to these figures, it will be seen that the frame of the truck as illustrated, consists of longitudinally extending channel irons 10 which are operatively supported as by springs on a rear driving axle 11. This axle may be connected to the motor in any suitable manner and I have illustrated for this purpose the drive shaft 12 entering the usual differential housing 13 and carrying a worm gear 14 engaging the gear wheel 15 on the rear axle. Any other form of drive may be used, however. It will be noted that the shaft 12 extends out beyond the worm 14.

Mounted to slide in the channel irons 10 as in guides is a rectangular frame 16 having cross bars or end pieces 17. This rectangular frame 16 slides in the longitudinal channel irons 10 and operatively engaged with this sliding frame 16 in a manner which will be later stated are the rearwardly and downwardly extending rods 18 through the rear ends of which passes the axle 19 of the auxiliary traction wheels.

I have illustrated the auxiliary traction wheels 20 as being two in number and being spaced from each other. Mounted upon this axle 19 to rotate therewith and disposed between the auxiliary traction wheels 20 is a gear wheel 21 which is driven by means of a worm 22 mounted upon a shaft 23 which, when the auxiliary traction wheels are in contact with the ground, extends upward and forward and is operatively connected to the rear extremity of the drive shaft 12 by a universal coupling of any desired character which is illustrated in Fig. 1, and which is designated 24. This coupling is of such character that it permits the drive shaft 23 to be raised or lowered.

It will be understood that the worm gear 22 and the gear 21 are so proportioned with relation to the gear 14 and gear wheel 15 that the auxiliary traction wheels 20 will be driven at the same speed as the main traction wheels 25 on the axle 11. The rods 18 embrace sleeves 26 at their rear ends which surround the axle 19 and from the outer ends of the axle 19 extend the rods 27 which are pivotally connected to ears 28 on the vehicle frame or on the rear axle housing or in any other suitable position, the rear ends of these rods 27 surrounding sleeves 29 mounted on the axle. Of course it will be understood that the auxiliary traction wheels 20 and the gear wheel 21 are mounted to rotate with the axle.

The sliding frame 16 is shifted longitudinally to raise or lower the auxiliary traction wheel by means of a screw-threaded rod 30 which has screw-threaded engagement with the cross bars 17 of the frame 16 and which passes through a suitable bearing and preferably passes beneath the driver's seat where it is provided with a gear wheel 31. Supported beneath the driver's seat is an operating wheel 32 which is operatively geared to the gear wheel 31. Thus the driver may at any time by turning the wheel 32 rotate the screw-threaded shaft 30 and thus either shift the frame 16 forward or rearward.

Attached to the rear cross bar of the frame 16 is a yoke 33 to which a cable 34 is attached which extends over a pulley 35 mounted on the rear of the vehicle frame, this cable extending downward and being attached to a lug or ear extending from the housing 36 which surrounds and houses the worm 22 and the gear wheel 21. It will thus be seen that when the frame 16 is shifted forward the auxiliary traction wheels will be raised and when the frame 16 is shifted rearward, the traction wheels will be lowered.

It is necessary to provide for taking up or cushioning the jar communicated to the auxiliary traction wheels, by the irregularities in the road, and to this end I provide longitudinally extending rods 37 which extend parallel to the sides of the frame 16 and are connected to the front and rear cross bars 17 of the frame 16. Slidingly mounted upon these rods are the blocks 38. Disposed between each of these blocks and the rear cross bar 17 is a coiled compression spring 39 which yieldingly resists rearward movement of the blocks.

Disposed around that portion of each rod 37 which extends forward of the block 38 are a plurality of coiled compression springs of different strengths. I have shown three of these springs separated from each other by collars. Next to the block 38 there is disposed a relatively strong coiled compression spring 40 and beyond this spring 40 there is a medial coiled compression spring 41 separated from the spring by a collar 42 and beyond the spring 41 there is disposed a light coiled spring 43 separated from the spring 41 by a collar 44.

The springs 43, as before stated, are light and designed to take up light shocks when the twin wheels 20 are running if the vehicle is lightly loaded. The springs 41 which are about 12" in length are medium heavy and help the spring 43 to take up shocks if the vehicle is loaded medium heavily. The springs 40 are heavy and take up shocks caused by heavy loads when the springs 43 and 41 are loaded to capacity. The springs 39 are very important inasmuch as they take up the shock caused by the dropping downward or backward of the twin wheels. In order to permit of movement of the twin wheels vertically so that the wheels may conform to the irregularities in the road, I preferably dispose a coiled spring 45 in the length of the cable 34.

While I have illustrated in Figs. 1 to 5, a form of my invention which I believe to be very effective, it is obvious that the idea might be embodied in many different forms without departing from the spirit of the invention and in Figs. 6 and 7, I show another of these forms. The mechanism illustrated in these figures is exactly the same as that illustrated in Figs. 1 to 5, except that a different form of traction mechanism is used and a different manner of connecting this traction mechanism to the transmission mechanism of the motor vehicle is shown.

In this form of the device I have illustrated the auxiliary tractor or traction wheel as a cast iron wheel designated 46 and mounted upon an axle 47, the outer face of this wheel being preferably transversely ribbed or toothed. This axle carries on it collars 48 to which are connected rods 49 which extend upward and forward to a sliding frame disposed upon the frame of the vehicle in the same manner as the frame 16 heretofore described and illustrated. Two iron rods 50 extend from the hub of the wheel 46 to each side of the vehicle and are connected to the rear axle housing 51 of the vehicle by a hinged connection to a plate or bracket 52 which is mounted upon the rear axle housing. This hinged connection 53 permits the bars 50 to raise or lower with the traction wheel 46. A yoke will connect the cable 34 to the axle 47 in the manner heretofore described.

Extending parallel to the rear driving axle 54 of the vehicle is a shaft 55 carrying a gear wheel 56 and also carrying what may be termed a sprocket wheel 57 over which passes an endless chain or web 58 which is formed with transverse lugs or corrugations upon its inner face fitting the corrugations of the sprocket wheel 57 and of the wheel 46 and having exterior lugs, teeth or corrugations to bite into the ground. The shaft 55 may be driven in any suitable manner from the driving axle 54 and I have shown the shaft as provided with the gear wheel 56 heretofore referred to engaging with an intermediate gear wheel 59 in turn engaging with a gear wheel 60 on the driving shaft 54. I do not wish to be limited, however, to any particular means for transmitting power from the motor to this endless belt or element 58 as it is obvious that it may be driven in many different ways. The means whereby this device may be raised or lowered may be precisely the same as that heretofore described.

It will be seen that the particular form of the propeller may be varied in many ways. I have illustrated two forms for this purpose, namely, the twin traction wheels 20 in Fig. 1 and the endless "caterpillar" band in Fig. 6, but I do not wish to be limited to any particular form of traction element or propeller. Neither do I wish to be limited to any particular manner of driving the traction element from the motor or to the particular manner illustrated whereby the traction element is raised or lowered and thus placed in operative or inoperative positions. It is obvious also that the manually operable means for raising or lowering the auxiliary traction element might be varied without departing from the spirit of the invention.

It will be noted that this mechanism permits the driver at any time to add a third driving wheel to his machine, that is, when the auxiliary traction element is raised, the machine drives with the usual two wheel traction. In climbing a hill, however, or on slippery roads, or in snow, or under other circumstances, where the impediment to forward movement is increased, this auxiliary traction may be brought into use, thus dispensing with the necessity of using chains on the main traction wheels. Furthermore it is to be noted that this device may be shifted into or out of operative position by the driver from his seat. The springs described are of very great importance because of the fact that the auxiliary propeller is disposed rearward of the main traction wheels and therefore would exert considerable leverage upon the machine were it not for these springs.

I claim:—

1. The combination with a motor driven truck having power driven main traction wheels, of an auxiliary power driven traction element shiftably mounted upon the truck for vertical movement into or out of operative engagement with the ground, a spring-carrying member mounted upon the truck and shiftable with relation thereto, manually operable means for shifting said spring-carrying member, springs mounted on said carrying member and shiftable therewith, and operative connections between the auxiliary traction element and said springs whereby said springs will yieldingly resist upward movement of the traction member.

2. The combination with a motor driven truck having main power driven traction wheels, of an auxiliary power driven traction element disposed rearward of the main traction wheels and operatively connected to the frame of the truck for vertical movement into or out of operative engagement with the ground, mechanism for transmitting power from the motor of the vehicle to said auxiliary traction element, means for raising and lowering the traction element including a sliding member operatively connected to the auxiliary traction element to cause its elevation or depression when the sliding element is shifted, and means for yieldingly holding it in engagement with the ground when it is lowered to operative position, comprising a series of springs carried by and moving with the sliding element and having different strengths and brought into successive action under load.

3. The combination with a motor driven truck having main traction wheels, of an auxiliary traction element disposed rearward of the main traction wheels and including an axle, rods pivotally connected to the truck and having bearings at their rear ends through which the axle passes, mechanism for transmitting power from the motor of the vehicle to said auxiliary traction element, and means for raising or lowering the traction element comprising a sliding frame mounted upon the truck, manually operable means for longitudinally shifting the frame, a flexible element operatively connected to the sliding frame and operatively connected to the axle of the auxiliary traction element, rods connected to the axle of the auxiliary traction element and extending upward and forward, members disposed within said frame and to which said rods are connected, and springs resisting longitudinal movement of said rods relative to said frame.

4. The combination with a motor driven truck having main traction wheels, of an auxiliary traction element disposed rearward of the main traction wheels and including an axle, rods pivotally connected to the truck and having bearings at their rear ends through which the axle passes, mechanism for transmitting power from the motor of the vehicle to said auxiliary traction element, means for raising or lowering the traction element comprising a sliding frame mounted upon the truck, manually operable means for longitudinally shifting the frame, a cable operatively connected to the sliding frame and operatively connected to the axle of the auxiliary traction element, rods connected to the axle of the auxiliary traction element and extending upward and forward, members disposed within said frame and to which said rods are connected, compression springs disposed between said members and the rear end of the frame and resisting rearward movement of said members, and a plurality of coiled compression springs disposed in succession between said members and the forward end of the frame and successively becoming operative to resist upward movement of the traction element and forward movement of said members.

5. The combination with a motor driven truck having main traction wheels, of an auxiliary traction element disposed rearward of the main traction wheels, rods operatively connected to the auxiliary traction element and pivotally connected to the frame of the truck to permit vertical movement of the auxiliary traction element, power transmitting mechanism operatively connected to the motor of the truck and to the auxiliary traction element, and means for manually shifting the auxiliary traction element comprising a sliding frame mounted upon the truck, a manually operable screw engaging said frame to shift it, a cable attached to the rear end of the frame and operatively engaged with the auxiliary traction element, said cable having a spring in its length, blocks mounted upon the frame for longitudinal sliding movement, upwardly and forwardly curved rods operatively connected to the auxiliary traction element and to said blocks, longitudinally extending rods mounted upon the frame and passing through the blocks, springs surrounding said rods and disposed between the rods and the rear end of the frame, and a plurality of coiled springs of different strengths disposed upon said rods between the forward ends of the blocks and the forward end of the frame and successively acting to resist the upward movement of the auxiliary traction element under load.

6. The combination with a motor driven truck having main power driven traction wheels, of a separate auxiliary traction element having operative driving engagement with the motor of the truck, a longitudinally shiftable spring carrier operatively connected to the traction element to cause the raising or lowering of the traction element, and springs forming part of the operative connections between said shiftable member and the traction element and yieldingly resisting relative movement of the traction element and said shiftable member.

7. The combination with a motor driven truck having traction wheels, of a separate auxiliary tractor element having operative driving engagement with the motor of the vehicle and mounted for movement toward or from the ground, a manually shiftable member mounted on the truck and carrying springs, and connecting members extending between the traction element and said manually shiftable member and engaged by said springs, the springs resisting relative movement of the traction element and said member.

8. The combination with a motor driven truck having traction wheels, of an auxiliary rotatable traction element mounted upon the truck for movement in a vertical plane, a member shiftably mounted upon the truck, rods operatively connected to the traction element and slidingly supported by said member, springs yieldingly resisting relative movement of the rods and said member, and manually operable means for shifting said member.

9. The combination with a motor driven truck having main traction wheels, of an auxiliary rotatable traction element having operative driving engagement with the motor of the truck, a sliding frame mounted upon the truck, manually operable means for shifting said sliding frame, rods extending from the traction element extending through the sliding frame and having sliding engagement therewith, and springs carried by the frame and resisting movement of the rods relative to the frame.

In testimony whereof I hereunto affix my signature in the presence of two witnesses.

HARNEY G. STEELE.

Witnesses:
 ALVIN BLOUGH,
 ARTHUR W. GARD.